(12) United States Patent
Dean et al.

(10) Patent No.: US 6,405,978 B1
(45) Date of Patent: Jun. 18, 2002

(54) DOUBLE-WALLED PANEL

(75) Inventors: Ivan James Dean; Michael Weston Jones, both of Burnley (GB); Thierry Roucier, Meudon-la-Foret (FR); Trevor Watmough, Burnley (GB)

(73) Assignee: Hurel-Dubois UK Ltd., Lancashire (GB)

( * ) Notice: Subject to any disclaimer, the term of this patent is extended or adjusted under 35 U.S.C. 154(b) by 0 days.

(21) Appl. No.: 09/601,314
(22) PCT Filed: Feb. 5, 1999
(86) PCT No.: PCT/GB99/00384
  § 371 (c)(1),
  (2), (4) Date: Sep. 25, 2000
(87) PCT Pub. No.: WO99/39976
  PCT Pub. Date: Aug. 12, 1999

(30) Foreign Application Priority Data

Feb. 7, 1998 (GB) .............................................. 9802597

(51) Int. Cl.[7] .............................................. B64C 3/18
(52) U.S. Cl. .................................... 244/123; 244/117 R
(58) Field of Search ............................ 244/117 R, 119, 244/123, 219, 132

(56) References Cited

U.S. PATENT DOCUMENTS

| | | | | |
|---|---|---|---|---|
| 1,918,897 A | * | 7/1933 | Colburn | 244/219 |
| 2,125,064 A | * | 7/1938 | Burgess | 244/219 |
| 3,524,588 A | * | 8/1970 | Duval | 244/110 B |
| 3,954,230 A | * | 5/1976 | Machuta | 244/219 |
| 4,667,905 A | * | 5/1987 | Hamm et al. | 244/123 |
| 5,060,471 A | * | 10/1991 | Torkelson | 415/119 |

* cited by examiner

Primary Examiner—Galen L. Barefoot
(74) Attorney, Agent, or Firm—Bacon & Thomas, PLLC

(57) ABSTRACT

An aircraft is provided including oppositely opposed inner and outer skins. The outer skin, when subject to an impact, is movable towards the inner skin. The outer skin includes stiffeners that project into a cavity defined by a clearance located between the inner and outer skins. The inner skin includes stiffeners that project into the cavity towards the outer skin. The outer skin contacts the stiffeners when the outer skin is flexed inwardly rather than the stiffeners on the outer skin contacting the inner skin. The inner skin includes a noise abatement portion.

22 Claims, 18 Drawing Sheets

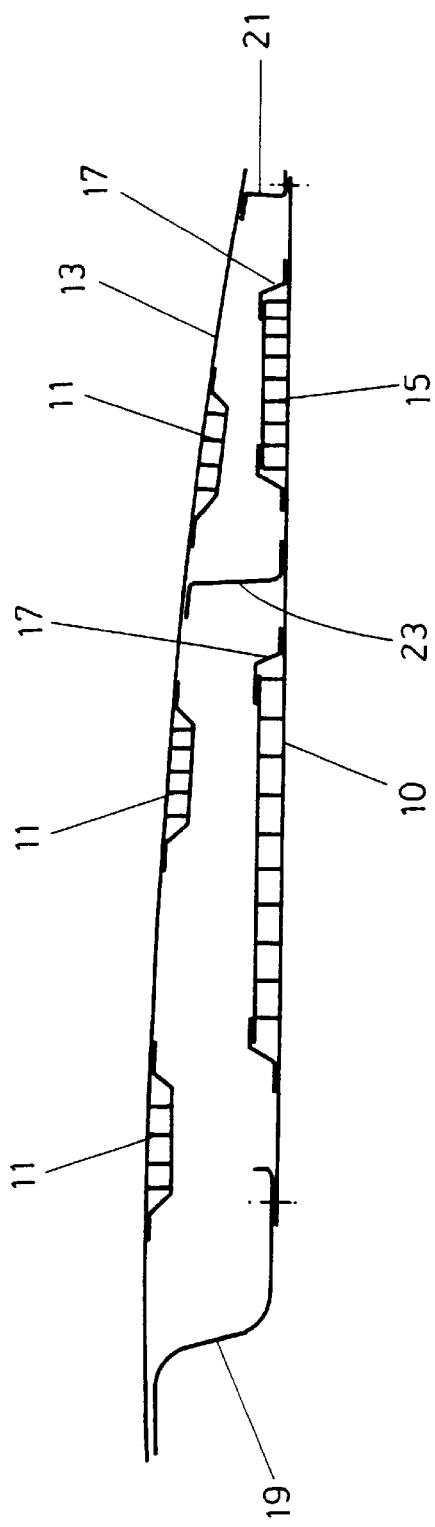
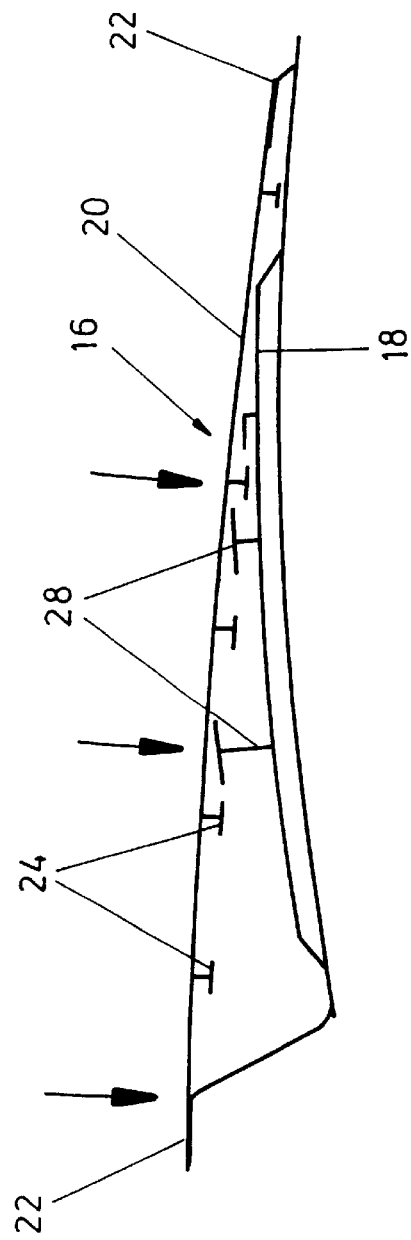
FIG. 1  PRIOR ART
FIG. 2

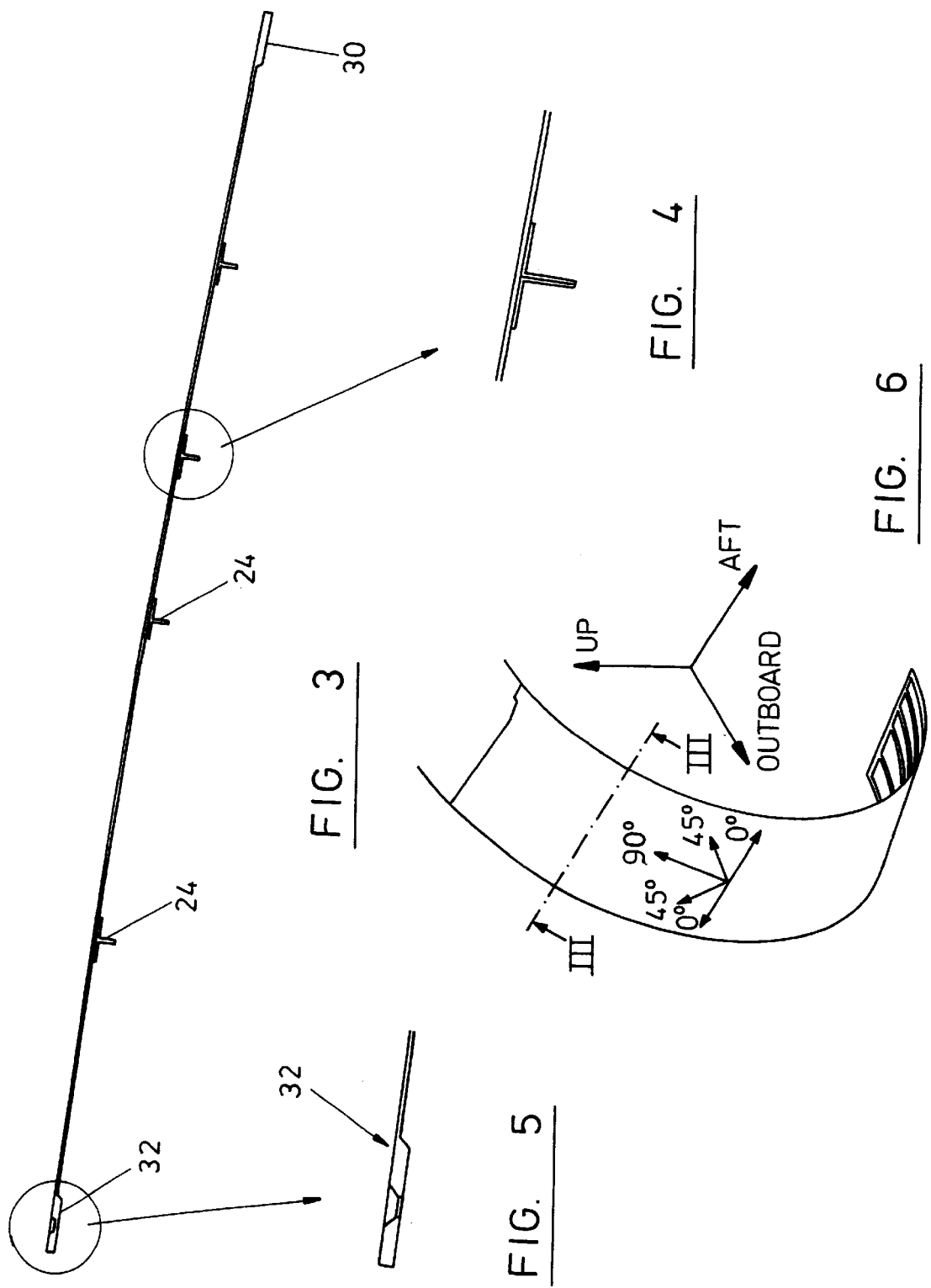

| LAMINATE | | | |
|---|---|---|---|
| PLY | MATERIAL SPEC. | ANGLE | AREA |
| 1 | HD402/304 | 0° | ALL OVER |
| 2 | HD402/304 | +45° | AS SHOWN |
| 3 | HD402/304 | 0° | AS SHOWN |
| 4 | HD402/304 | +45° | AS SHOWN |
| 5 | HD402/304 | 0° | AS SHOWN |
| 6 | HD402/304 | +45° | ALL OVER |
| 7 | HD402/304 | +45° | AS SHOWN |
| 8 | HD402/304 | 0° | AS SHOWN |
| 9 | HD402/304 | +45° | AS SHOWN |
| 10 | HD402/304 | +45° | AS SHOWN |
| 11 | HD402/304 | 0° | ALL OVER |
| 12 | HD402/304 | +45° | AS SHOWN |
| 13 | HD402/304 | 0° | AS SHOWN |
| 14 | HD402/304 | +45° | AS SHOWN |
| 15 | HD402/304 | 0° | ALL OVER |
| 16 | HD402/304 | +45° | AS SHOWN |
| 17 | HD402/304 | +45° | AS SHOWN |
| 18 | HD402/304 | +45° | AS SHOWN |

| PLY | MATERIAL | ANGLE | AREA |
|---|---|---|---|
| 1 | 0803/M21 | 0° | PANEL |
| 2 | " | +45° | PANEL |
| 3 | " | -45° | PANEL |
| 4 | " | 90° | PANEL |
| 5 | " | +45° | FRAME |
| 6 | " | 0° | FRAME |
| 7 | " | -45° | FRAME |
| 8 | " | 90° | FRAME |
| 9 | " | -45° | FRAME |
| 10 | " | +45° | FRAME |
| 11 | " | 0° | FRAME |
| 12 | " | 0° | STIFFENER |
| 13 | " | -45° | STIFFENER |
| 14 | " | 90° | STIFFENER |
| 15 | " | +45° | STIFFENER |
| 16 | " | 0° | STIFFENER |
| 17 | " | 0° | STIFFENER |
| 18 | " | -45° | STIFFENER |
| 19 | " | 90° | STIFFENER |
| 20 | " | +45° | STIFFENER |
| 21 | " | 0° | STIFFENER |

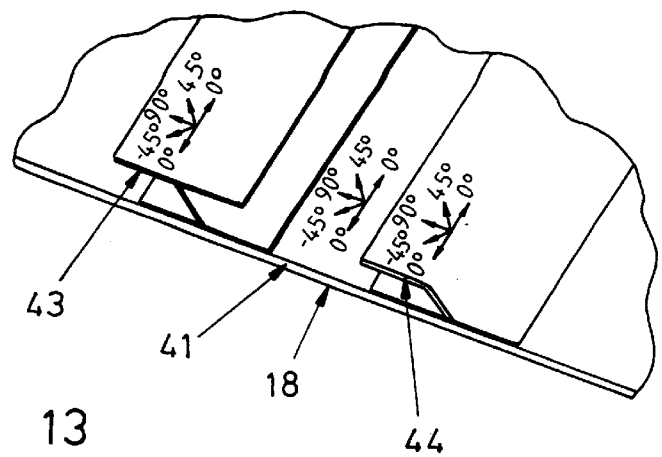
FIG. 13
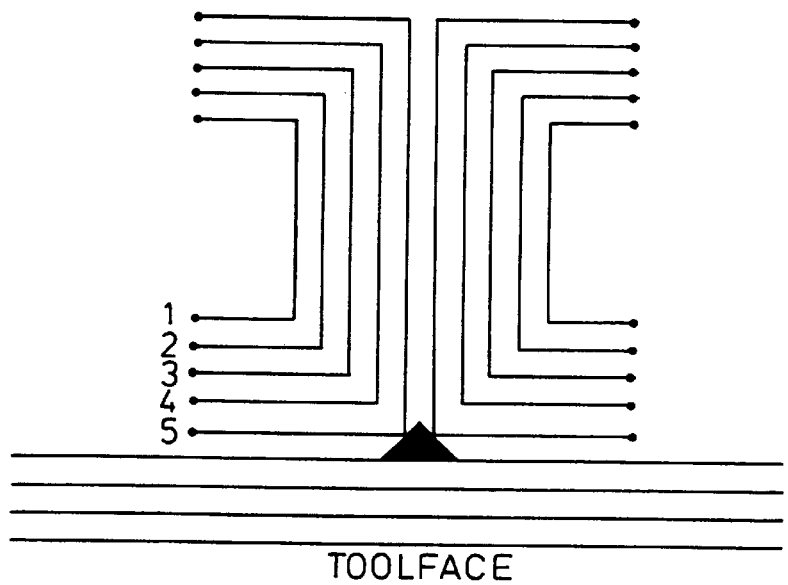
FIG. 14
| PLY | MATERIAL | WARP FIBRE ANGLE | AREA |
|---|---|---|---|
| 1 | G803/M21/37 | −45° | ALL OVER |
| 2 | G803/M21/37 | 90° | ALL OVER |
| 3 | G803/M21/37 | +45° | ALL OVER |
| 4 | G803/M21/37 | 0° | ALL OVER |
| 5 | G803/M21/37 | −45° | ALL OVER |
| LAMINATES FOR ITEM 42 & 43 | | | |
FIG. 18

| PLY | MATERIAL | WARP FIBRE ANGLE | AREA |
|---|---|---|---|
| 1 | G803/M21/37 | -45° | ALL OVER |
| 2 | G803/M21/37 | 90° | ALL OVER |
| 3 | G803/M21/37 | +45° | ALL OVER |
| 4 | G803/M21/37 | 0° | ALL OVER |
| 5 | G803/M21/37 | -45° | ALL OVER |

TOOLFACE

| PLY | MATERIAL | WARP FIBRE ANGLE | AREA |
|---|---|---|---|
| 19 | G803/M21/37 | 90° | AS SHOWN |
| 18 | G803/M21/37 | −45° | AS SHOWN |
| 17 | G803/M21/37 | +45° | AS SHOWN |
| 16 | G803/M21/37 | 0° | AS SHOWN |
| 15 | G803/M21/37 | +45° | AS SHOWN |
| 14 | G803/M21/37 | −45° | AS SHOWN |
| 13 | G803/M21/37 | 90° | AS SHOWN |
| 12 | G803/M21/37 | 90° | AS SHOWN |
| 11 | G803/M21/37 | −45° | AS SHOWN |
| 10 | G803/M21/37 | +45° | AS SHOWN |
| 9 | G803/M21/37 | 0° | AS SHOWN |
| 8 | G803/M21/37 | 0° | AS SHOWN |
| 7 | G803/M21/37 | +45° | AS SHOWN |
| 6 | G803/M21/37 | −45° | AS SHOWN |
| 5 | G803/M21/37 | 90° | AS SHOWN |
| 4 | G803/M21/37 | 90° | ALL OVER |
| 3 | G803/M21/37 | −45° | ALL OVER |
| 2 | G803/M21/37 | +45° | ALL OVER |
| 1 | G803/M21/37 | 0° | ALL OVER |

LAMINATES FOR ITEM 41

| PLY | MATERIAL | WARP FIBRE ANGLE | AREA |
|---|---|---|---|
| 30 | G803/M21/37 | 90° | AS SHOWN |
| 31 | G803/M21/37 | +45° | AS SHOWN |
| 32 | G803/M21/37 | 0° | AS SHOWN |
| 33 | G803/M21/37 | −45° | AS SHOWN |
| 34 | G803/M21/37 | 90° | AS SHOWN |

| PLY | MATERIAL | WARP FIBRE ANGLE | AREA |
|---|---|---|---|
| 35 | G803/M21/37 | 90° | AS SHOWN |
| 36 | G803/M21/37 | +45° | AS SHOWN |
| 37 | G803/M21/37 | 0° | AS SHOWN |
| 38 | G803/M21/37 | -45° | AS SHOWN |
| 39 | G803/M21/37 | 90° | AS SHOWN |
| 40 | G803/M21/37 | 90° | AS SHOWN |
| 41 | G803/M21/37 | +45° | AS SHOWN |
| 42 | G803/M21/37 | 0° | AS SHOWN |
| 43 | G803/M21/37 | -45° | AS SHOWN |
| 44 | G803/M21/37 | 90° | AS SHOWN |

| PLY | MATERIAL | WARP FIBRE ANGLE | AREA |
|---|---|---|---|
| 30 | G803/M21/37 | 90° | AS SHOWN |
| 31 | G803/M21/37 | +45° | AS SHOWN |
| 32 | G803/M21/37 | 0° | AS SHOWN |
| 33 | G803/M21/37 | -45° | AS SHOWN |
| 34 | G803/M21/37 | 90° | AS SHOWN |

| PLY | MATERIAL | WARP FIBRE ANGLE | AREA |
|---|---|---|---|
| 20 | G803/M21/37 | 90° | AS SHOWN |
| 21 | G803/M21/37 | +45° | AS SHOWN |
| 22 | G803/M21/37 | 0° | AS SHOWN |
| 23 | G803/M21/37 | -45° | AS SHOWN |
| 24 | G803/M21/37 | 90° | AS SHOWN |
| 25 | G803/M21/37 | 90° | AS SHOWN |
| 26 | G803/M21/37 | +45° | AS SHOWN |
| 27 | G803/M21/37 | 0° | AS SHOWN |
| 28 | G803/M21/37 | -45° | AS SHOWN |
| 29 | G803/M21/37 | 90° | AS SHOWN |

TOOLFACE

| PLY | MATERIAL | WARP FIBRE ANGLE | AREA |
|---|---|---|---|
| 1 | G803/M21/37 | 0° | ALL OVER |
| 2 | G803/M21/37 | +45° | ALL OVER |
| 3 | G803/M21/37 | -45° | ALL OVER |
| 4 | G803/M21/37 | 90° | ALL OVER |
| 5 | G803/M21/37 | 90° | AS SHOWN |
| 6 | G803/M21/37 | -45° | AS SHOWN |
| 7 | G803/M21/37 | +45° | AS SHOWN |
| 8 | G803/M21/37 | 0° | AS SHOWN |
| 9 | G803/M21/37 | 0° | AS SHOWN |
| 10 | G803/M21/37 | +45° | AS SHOWN |
| 11 | G803/M21/37 | -45° | AS SHOWN |
| 12 | G803/M21/37 | 90° | AS SHOWN |
| 13 | G803/M21/37 | 90° | AS SHOWN |
| 14 | G803/M21/37 | -45° | AS SHOWN |
| 15 | G803/M21/37 | +45° | AS SHOWN |
| 16 | G803/M21/37 | 0° | AS SHOWN |
| 17 | G803/M21/37 | 0° | AS SHOWN |
| 18 | G803/M21/37 | +45° | AS SHOWN |
| 19 | G803/M21/37 | -45° | AS SHOWN |

DOUBLE-WALLED PANEL

The present invention relates to panels and a method of making such panels as well as to reinforcing structures and a method of making such structures and in particular to aircraft panels.

FIG. 1 is a cross-sectional view through a part of a known racelle structure.

The section shows a honeycomb structure 11 on an outer skin 13 and a honeycomb structure 15 on an inner skin 10. The section is built up in a series of manufacturing step comprising:

laying the skin 10 onto a former and curing that skin,
laying the honeycomb structure 15 onto the skin,
laying peripheral skins 17 around the periphery of the structures 15 to hold the structures 15 in place.

The inner skin 10 is then perforated by drilling to allow the acoustic honeycomb panels to reduce the sound emitted from the thrust reverser.

The outer skin is then formed in a similar manner and connected to the inner skin by riveting end sections 19 and 21 to both sections and riveting an intermediate connection member 23 to both sections.

The inner and outer skins thus form a structural one piece unit having considerable strength and rigidity. There are, though, disadvantages with such an aircraft panel.

One disadvantage are the many manufacturing steps required to make the panel. The outer skin is first formed in its various stages, then the honeycomb structures are attached, then the inner skin with its many manufacturing stages is attached. This is time consuming. Furthermore, it is time consuming to attach all of the rivets. A further disadvantage in the manufacturing procedure is that the inner skin is formed in a series of steps, before being rivetted to the outer skin.

The honeycomb provides noise attenuation and strength. However, the skin 10 has to be drilled in order for the honeycomb action to act as a noise attenuator thereby significantly reducing the strength of the panel.

Apart from the manufacturing problems there are also significant operational problems. Should the outer surface of the outer skin be subject to an impact from a dropped tool or be struck by a truck, for instance, the necessary rigidity of the one piece structural panel acts against the panel being able to resist impact damage. Such a panel would suffer damage necessitating repair prior to flying again under an impact of as little as 5 Joules. Repair of the honeycomb is extremely expensive.

Furthermore, if the panel is damaged, the complete door will require replacement as the inner and outer skins act together to provide the reinforced structure. Thus, a damaged outer skin cannot be patched up and it is necessary to ground the aircraft until a new panel can be fitted. Furthermore, to repair the panel or to inspect the internal parts of the panel just in case they have been damaged by an impact it is necessary to dismantle the panel by removing the numerous connecting riverts. This is not a facility available at most airports. Consequently a new panel has to be flown in and the old panel taken elsewhere for disassembly, repair and reconstrunction.

It is an object of the present invention to attempt to overcome at least some of the above described disadvantages.

According to one aspect of the present invention a panel comprises a first skin structure incorporating a first skin and a second skin structure incorporating a second skin, part of the second skin being movable towards the first skin.

The first skin structure may be relatively rigid compared to the second skin structure. The second skin structure may be flexible relative to the first skin structure.

The second skin structure may be more flexible than the first skin structure.

The first and second skin structures may be connected together and may be detachably connected together, for instance by releasable fasteners.

The first and second skin structures may be connected together at a peripheral region.

The first and second skin structures may be separate from each other at locations in from the peripheral region of those structures. The first and second skin structures may be spaced from each other at all locations in from the peripheral regions of those structures.

The first and second skins may define a cavity between them. The first skin structure may include a noise abatement portion and the noise abatement portion may extend inwardly of the external surface of the first skin. The first skin may be perforated in the region of the noise abatement portion.

The noise abatement portion itself may comprise an antennae or an electronics device.

The part of the second skin that is movable towards the first skin may be arranged to flex towards the first skin when subject to an impact. The part of the second skin that has flexed towards the first skin may be arranged to flex back to its previous configuration after the impact.

The first, skin structure or, alternatively or additionally, the second skin structure may include flanged strengthening portions connected to the skins extending inwardly of the cavity. When both the first and second skin structures include flanged strengthening portions the second skin strengthening portion may be arranged to move between flanged strengthening portions of the first skin when the second skin moves towards the first skin.

When the first skin structure includes at least one strengthening portion, the second skin, when flexed towards the first skin, may be arranged to abut the strengthening portion on the first skin. When the second skin structure also includes at least one strengthening portion, flexure of the second skin structure towards the first skin structure may be arranged to cause the second skin to abut with the strengthening portion of the first skin structure rather than the strengthening portion of the second skin structure contacting the first skin.

The first skin structure may include at least one flanged strengthening portion facing the second skin and extending over the noise abatement portion and possibly to at least one side or both sides of the noise abatement portion. When the flanged strengthening portion extends to one or both sides of the noise abatement portion the extent of the flanged strengthening portion into the cavity from the first skin or the extent towards the second skin may be substantially constant along the length of the strengthening portion.

The first skin structure may comprise an inner skin structure and the second skin structure may comprise an outer skin structure.

The panel may be an aircraft panel.

The aircraft panel may comprise part of a thrust reverser or may comprise a fan duct structure.

According to another aspect of the present invention a method of making a skin structure of an aircraft panel comprises laying at least one flexible filamentary layer onto a support shaped so as to locate a noise abatement portion before causing the or each flexible filamentary layer to harden.

The noise abatement portions may comprise an antennae or an electronic device.

Subsequently, the noise abatement portion may be located onto the filamentary layer and subsequently at least one further flexible filamentary layer may be located over the noise abatement structure before causing the flexible filamentary layers to harden.

The method may comprise locating at least one flanged flexible filamentary portion on to a flexible filamentary layer before causing the filamentary layers and filamentary portion to harden. The method may comprise locating the flanged flexible portion over the filamentary layer that extends over the noise abatement portion and possibly beyond the noise abatement structure to at least one side before causing the filamentary layers and the flexbile portion to harden. The method may comprise making the uppermost extent of the flanged flexible portion a substantially constant distance from the downwardly facing surface of the lowermost filamentary layers.

The present invention also includes a skin structure when made according to the aforementioned method.

According to a further aspect of the present invention an aircraft panel comprises at least one skin extending over substantially the complete extent of the panel, the panel including a noise abatement structure attached to the skin, the noise abatement structure being covered with a sheet, the sheet having perforations therethrough.

With such a panel, the panel has strength in the continuous skin without the skin being perforated and yet the skin still has the noise abatement advantages.

The noise abatement structure may comprise an antennae or an electronic device.

The sheet may be arranged to be on the outside of the panel.

The skin may include at least one stiffener on the opposite side of the skin to the noise abatement structure.

According to a further aspect of the present invention a reinforced structure comprises a plurality of arms extending from different directions towards a common junction, each arm including at least one layer of fibrous material extending both in a first direction and in a second direction transverse to the first direction, at least one of those layers of two adjacent arms being common to those arms.

The noise abatement structure may be located in a recess of the skin. The sheet and the skin may form a substantially continuous surface.

The layer that is common between adjacent arms may have a generally U-shaped cross-section along each arm.

The structure may have a plurality of layers that are in common with adjacent arms.

The present invention also includes a method of making a reinforced structure comprising a plurality of arms extending from different directions towards a common junction, the method comprising laying at least one fibrous layer to extend along one arm in a first direction and a second direction transverse thereto with the layer also being laid along an adjacent arm to also extend in a first direction and a second direction transverse thereto.

According to another aspect of the present invention a reinforced structure comprising a plurality of arms extending from different directions towards a common junction comprises each arm including a plurality of parallel fibrous layers extending towards the common junction with a first layer of one arm being common with a layer of an adjacent arm on one side of that arm and a second layer of that arm being in common with the layer of an adjacent arm on the other side of that arm, the first and second layers contacting each other at their co-extent on each arm.

The present invention also includes a method of making a reinforced structure comprises a plurality of arms extending from different directions towards a common junction, the method comprising laying two parallel layers in contact with each other along one arm with those layers extending towards the junction and then away from the junction along different arms on either side of the arm that they are in contact with each other along.

According to another aspect of the present invention a method of making a reinforced structure comprising a plurality of arms extending from different directions towards a common junction comprises placing a layer of fibrous material around a central region of the junction and laying fibrous layers from each arm to extend towards the junction from one arm and subsequently away from the junction along an adjacent arm with the laid fibrous layers subsequently being caused to harden substantially simultaneously.

The present invention also includes a method of making such a reinforced structure comprising laying the layer that extends along one arm towards the junction and then away from the junction along a different arm in contact with the layer that extends around the central region of the junction.

The present invention also includes a reinforced structure made by such a method.

A reinforced structure as herein described may comprise the depth of an arm or flange on one side of the junction increasing or decreasing in the direction towards the junction. The depth of an arm or flange on the other side of the junction may decrease or increase in a direction away from the junction.

The depth of arms or flanges extending transverse to the arm on one side and the arm on the other side of the junction may be substantially constant.

The reinforced structure may include two junctions that one arm or flange extends between.

The present invention includes any combination of the herein referred to features or limitations and includes a method of making a reinforced structure as herein referred to and a reinforced structure made by such a method.

The present invention may be carried into practice in various ways and several embodiments will now be described by way of example and with reference to the accompanying drawings, in which:

FIG. 1 is a cross-sectional view through a part of a known nacelle structure.

FIG. 2 is a schematic cross-section through an aircraft panel of a thrust reverser 16 including an inner skin 18 and an outer skin 20;

FIG. 3 is a cross-sectional side view of the outer skin 20 and

FIGS. 4 and 5 are details of parts of FIG. 3;

FIG. 6 is a perspective view of the outer skin 20 taken from the aft direction and from the outside of the panel;

FIG. 13 is a detailed view showing the shape of two of the stiffeners on the inner skin 18;

FIGS. 14, 15 and 16 are details showing the locations of various laminates used in the outer skin;

FIGS. 17 to 19 are tables showing the orientation of elongate filaments used in various layers of the outer skin;

Figures 7, 8:
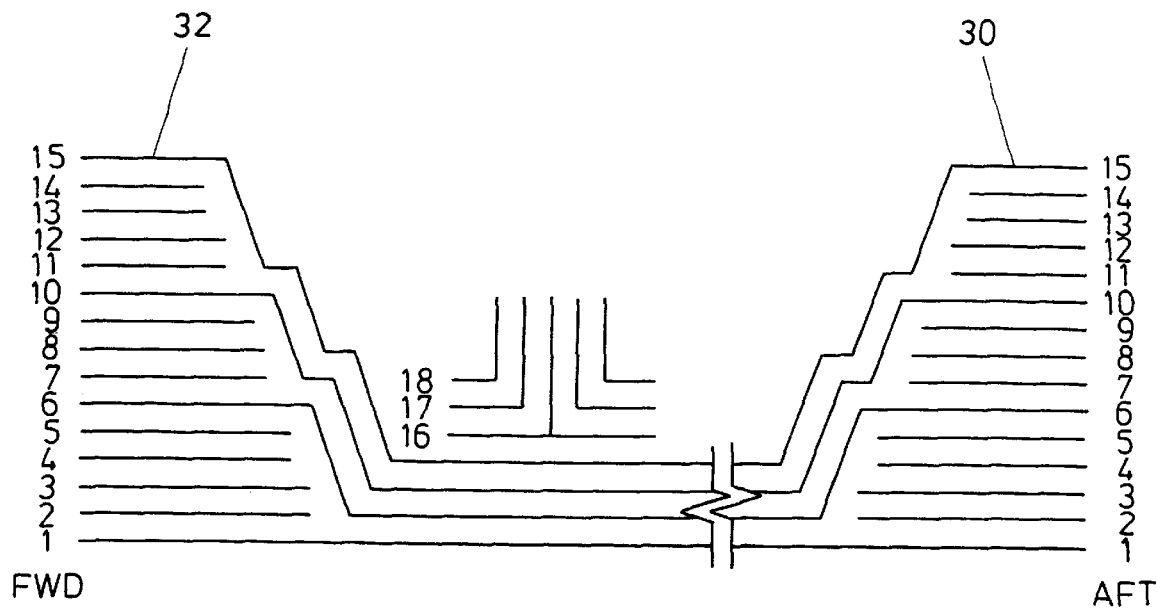
FIG. 7 is an enlarged sectional view through a blade sufficient on the outer skin 20.
FIG. 8 is a table showing the preferred orientation of the continuous filaments of each layer.

As shown in FIG. 2, the door 16 includes an inner skin 18 and an outer skin 20. Although the inner and outer skins are connected together around their periphery, as shown schematically at 22, those connections are detachable. The skins 18 and 20 are otherwise not connected to each other and are in fact out of contact with each other across their co-extent. The outer skin 20 may be more flexbile than the inner skin.

The outer skin 20 has a plurality of spaced generally parallel blade stiffeners 24 that project inwardly of the cavity defined between the two skins. The inner skin 18 has a plurality of T-shaped stiffeners 28 that project inwardly of the cavity between the two skins with the stiffeners 28 being generally parallel to each other. Although not shown, stiffeners on the inner skin 18 within the cavity may extend perpendicular to the stiffeners 28.

The inner skin 18 including stiffeners 28 comprises substantially the complete structure that is able to withstand normal operating loads and, although the outer skin 20 may assist slightly in the structural strength of the door that is not its main purpose. The outer skin has two main functions.

One function of the outer skin 20 is to provide a smooth surface to assist in the linear smooth flow of air over the panel. That it is able to do as their are no connections along its main extent to other parts of the panel, such as to connections from its outer surface to its flanges and no connections to flanges of the inner skin.

A further function is to provide a flexible outer layer that is able to withstand knocks such as tools falling on to the panel without the panel losing its structural integrity. Such impacts are largely absorbed by the outer skin flexing inwardly, towards the inner skin. That inwards movement is permitted as the blade stiffeners 24 can move towards the stiffeners 28 and move between those stiffeners or stop short of the stiffeners 28 and any cross stiffeners on the inner sheet. It is possible that the stiffeners on the outer skin will abut the inner stiffeners upon sufficient movement of the outer skin. However, by the time that occurs, almost all of the energy from the impact will have been absorbed. Alternatively, the outer skin can abut the stiffeners on the inner skin when the outer skin is subject to a significant impact.

Consequently the structural reinforcement portion of the panel provided by the inner skin will not be adversely affected by impacts and indeed impacts of approximately 50 Joules may be able to be resisted without structural damage.

Should an impact be sufficiently great to cause damage, that damage will occur first on the outer skin and will be visible. As the outer skin is not structural the plane may still be able to fly until the outer skin is able to be repaired. Alternatively, the outer skin can be repaired at most airports as a covering can be patched on or a hole covered with the basic facilities at the airport as it is not necessary for the repaired skin to be load carrying. The outer skin can be detached from the inner skin without the panel being removed from the aircraft. Removal of the outer skin also allows the inner skin to be inspected.

If the impact is very considerable and the outer skin contacts the stiffeners from the inner skin then the impact load will be transferred to the inner structure. The stiffeners may fail at their ends on the inner skin and becomes separated. However, the impact will be absorbed and the basic structure will remain intact and functional, albeit that a repair may be required before the structure can withstand a similar impact in the same place. Indeed it can be seen that the larger or more flexible or thin the outer layer, the greater the load that can be absorbed. Thus, contrary to conventional thinking the outer panel is designed to be relatively thin and flexible.

The manufacture and structure of the inner and outer skins will now be described.

As shown in FIGS. 3 to 7, the outer skin 20 includes four blade stiffeners 24 running parallel to each other in a direction transverse to the fore and aft direction. The skin 20 is curved slightly in the fore and aft direction and also in a direction perpendicular thereto.

The skin is four plies thick along the majority of its extent with fifteen plies being present at the upper and lower ends 30 and 32 of the skin in a fore and aft direction.

The skin is assembled and moulded in one shot by placing a carbon fibre layer 1 habit its continuous tows extending from the top to the bottom on to a shaped support (not shown). Then, at each upper and lower end 30 and 32, four further layers 2, 3, 4 and 5 are placed along the ends 30 and 32 only. Then a further layer 6 extending from the top to the bottom is laid before three further layers 7, 8 and 9 at the ends only are laid, followed by a layer 10 from the top to the bottom, four further layers 11 to 14 at the ends only and finally a layer 15 that extends from top to bottom.

The layers that extend from the top to the bottom may have their continuous filaments extending in that direction, as may the layers at the ends only. Alternatively, the layers at the ends only may have their continuous filaments extending at an angle to the top to bottom direction. If desired, at least some of the layers that extend from the top to the bottom may have their continuous filaments extending in the fore and aft direction.

The stiffeners 24 are then built up on to the layer 15 with each stiffener comprising an inverted T-shaped layer 16 having the bar of the T resting on the layer 15 with two further right angles layers 17 and 18 resting in each of the angles of the T to form the stiffeners.

The continuous filaments of the layers of stiffeners and the direction that the continuous filaments of the skin extend in are shown in FIG. 8 with reference to the angles indicated in FIG. 6.

Tools are then brought into place to hold the layers in position before curing the resin and carbonizing the fibre to form the panel shown. The ends 30 and 32 then have countersunk holes 34 drilled through their fifteen layers to allow bolts to pass therethrough to enable the outer skin to be detachably mounted on the inner skin or to enable grips to be applied to the skin to allow the strength of the skin to be tested.

Figures 9, 11:
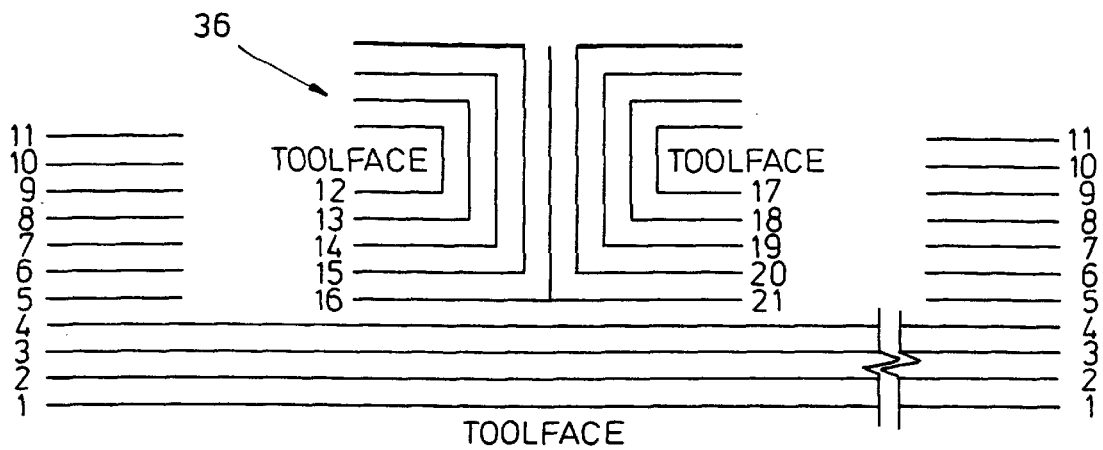
FIG. 9 is an enlarged view similar to that of FIG. 7 showing an alternative form of blade stiffener.
FIG. 11 is a view showing the preferred orientation of the continuous filaments of the layers shown in FIG. 9.
Figure 10A:
FIG. 10A is an end view of FIG. 10.
Figure 10:
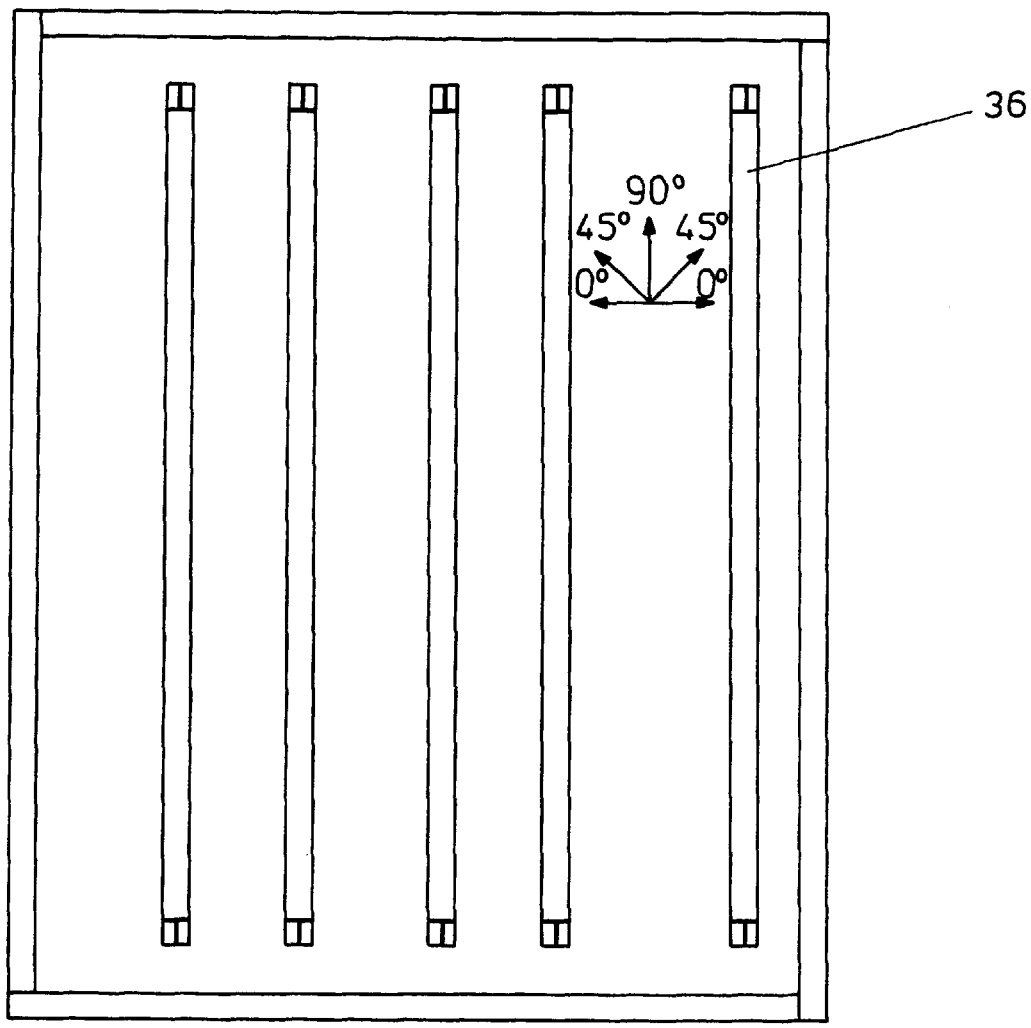
FIG. 10 is a view from the inwardly facing surface of an outer skin having the stiffeners shown in FIG. 8.

In FIGS. 9, 10 and 10A a modified inner skin is shown.

The skin is formed by laying four layers 1, 2, 3 and 4 from the top to the bottom. Each end then has seven further layers 5 to 11 added. The stiffeners 36 are of I-section and are assembled by laying two U-shaped layers 16 and 21 back to back having their free ends facing away from each other. Subsequent U-shaped layers 15 to 12 are then located inside the member 16 and similar layers are placed inside the layer 21 to form the configuration shown in FIG. 8. Tools hold the layers in place. Curing and carbonizing is then effected.

The continuous filaments of the layers have the orientation shown in FIG. 11.

FIG. 10 shows that each stiffener 36 stops short of the top and bottom of the skin. In order to assist in retaining the stiffeners in position on the skins that they are formed with, conventional rivets or known 'Z' rivets may be used between those parts at any location where separation may tend to occur either during normal use or as a result of an impact on the skin.

The construction of the inner skin 18 will now be described. It will be appreciated that, as with the outer skin 20, the inner skin 18 can be made in a one shot mould.

Figure 12:
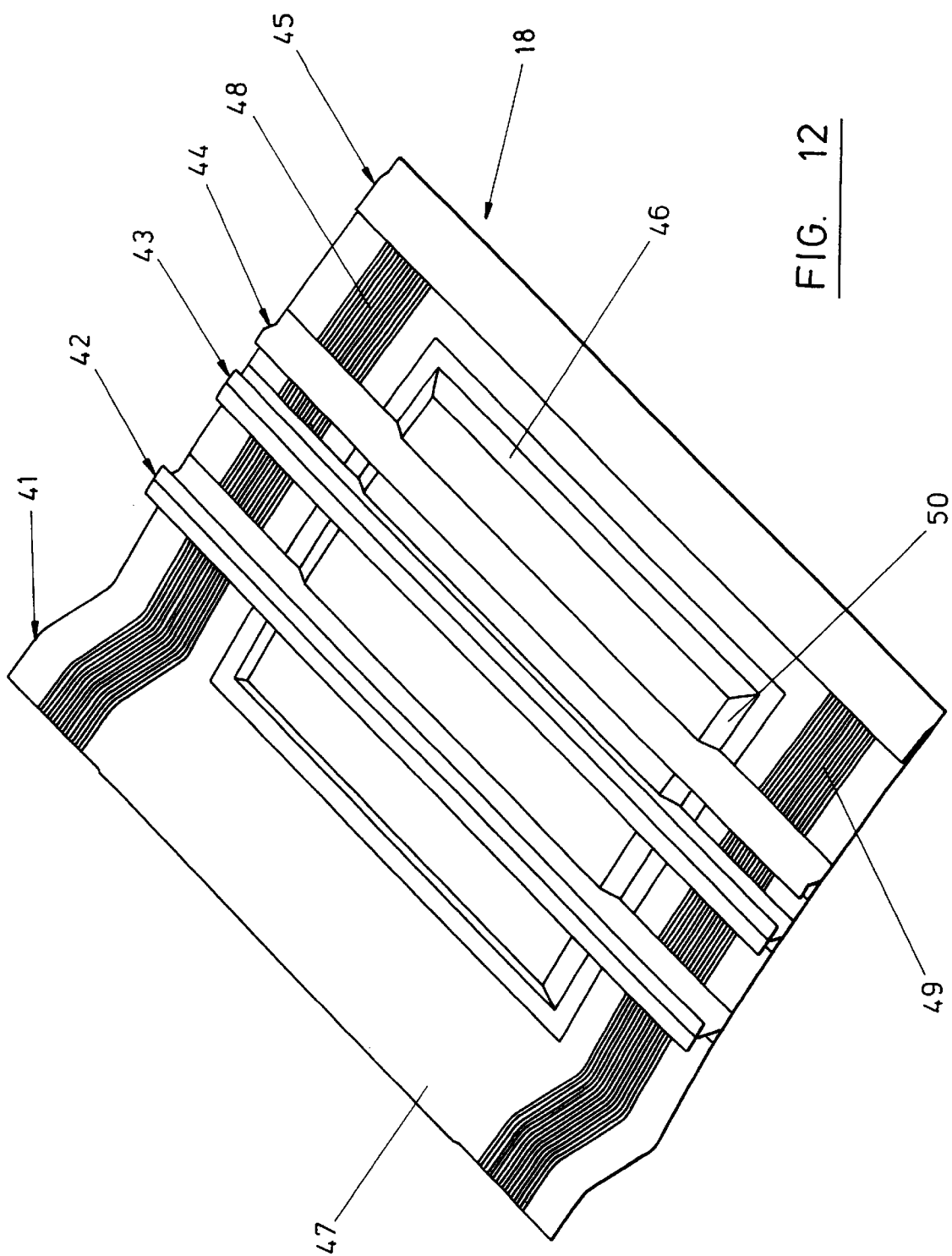
FIG. 12 is a perspective view of the inner skin 13.
Figure 12A:
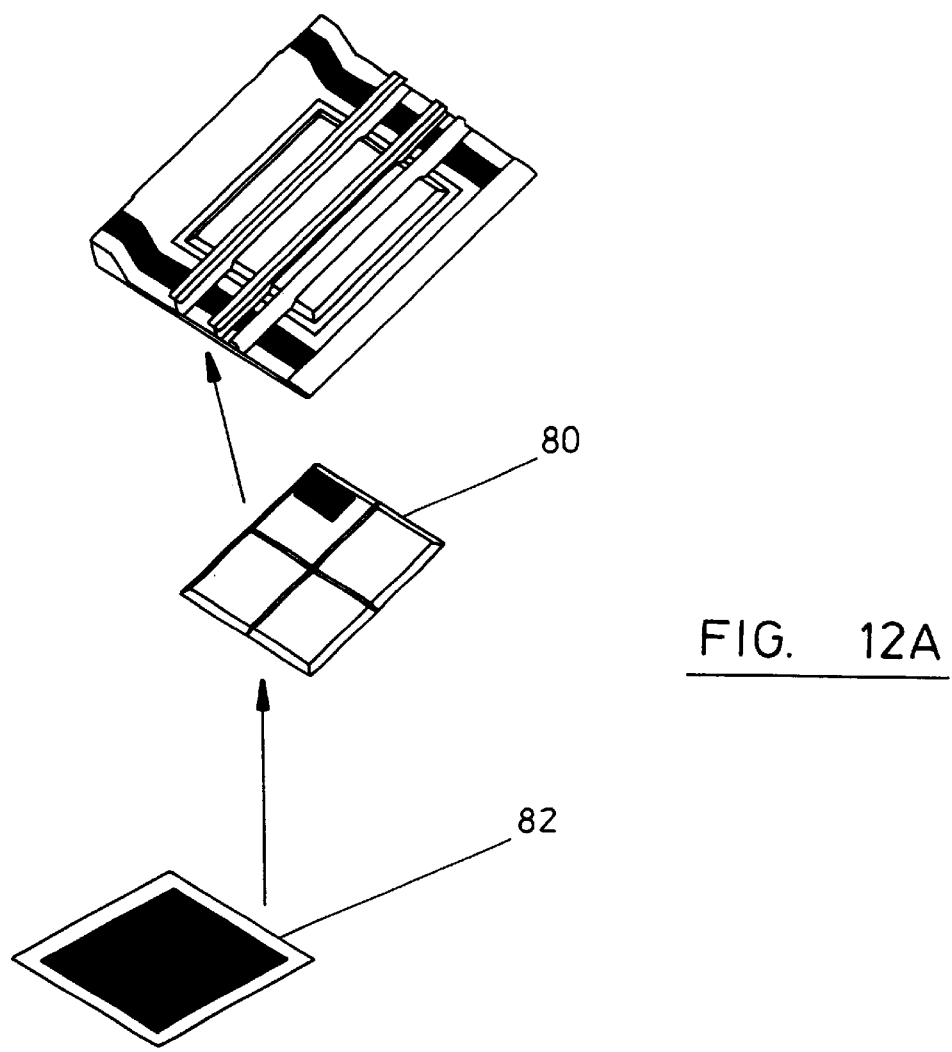
FIG. 12A is an exploded view of the inner portion of the skin of FIG. 1 showing the honeycomb panel 80 and the perforate panel 82.
Figure 12B:
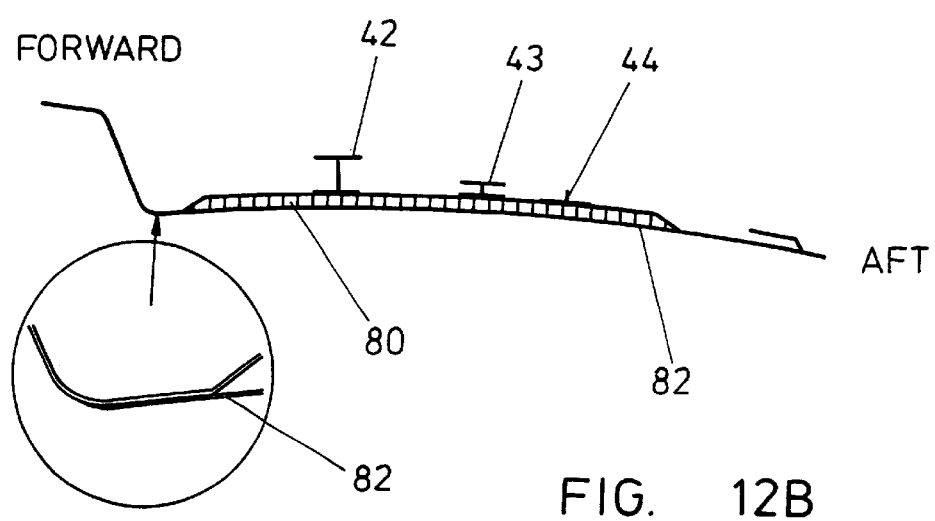
FIG. 12B is a cross-section through the fore and aft direction of FIG. 12.

The inner skin 18 shown in FIG. 12 comprises a base 41 that has a recess 46 extending into the cavity that, in use, will be defined between the inner and outer skins. An aluminum honeycomb structure (not shown) is located in that recess. A skin then covers the exposed honeycomb and is perforated across its extent to allow the honeycomb to function primarily as a noise abatement portion. It will be appreciated though that the inner skin extends across the complete extent of the base without being weakened by perforations. Rather it is the skin that subsequently covers the honeycomb that is perforated and weakened.

Although the honeycomb will afford some strength to the inner skin, the majority of the strength comes from the I-shaped stiffeners 42 and 43, the partial I-shaped stiffener 44 and the stiffener 45 having two parallel flanges joined by a curved intermediate section. As stiffeners extend across the honeycomb, even though the layers on each side of the honeycomb have been perforated and weakened the stiffeners still allow the inner skin to remain strong.

The honeycomb may comprise at antennae or an electronic device. If the honeycomb is of metal then that metal may comprise the antennae. Thus the honeycomb has a function allowing weight to be reduced elsewhere. The honeycomb may also pull air into the structure thereby reducing noise and increasing stream lining of the structure.

The end 47 of the base layer 41 is bent outwardly and upwardly and then parallel with the remainder of the majority of the base layer 41 to provide, with that parallel portion, a flange.

The assembly and manufacture of the inner skin will now be described.

Figures 16, 19:
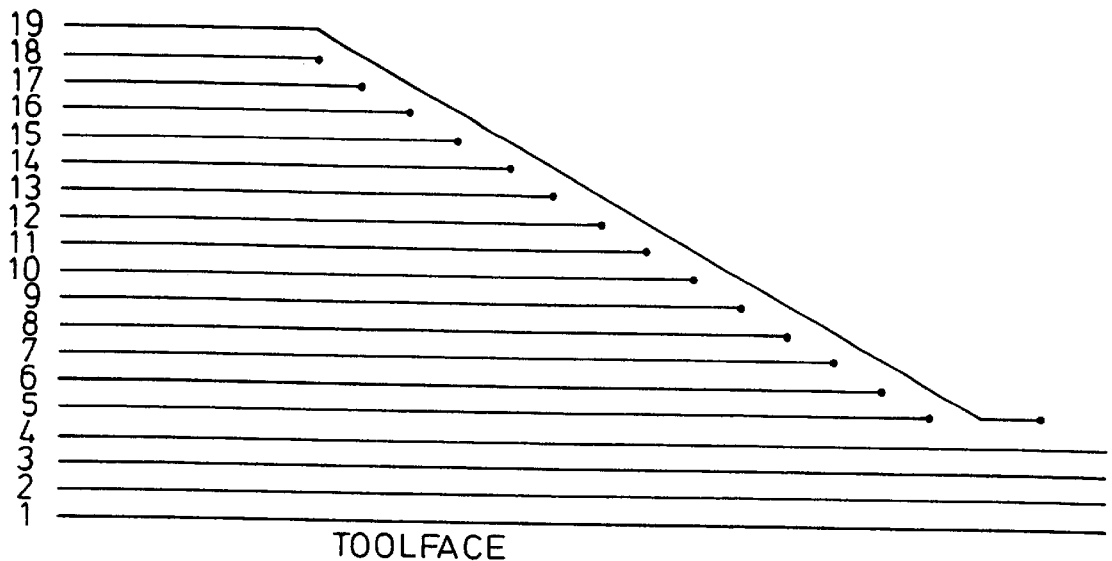

First of all a plurality of square or rectangular layers (not shown) are placed on a tool face. Then the honeycomb is placed on those layers with the layers extending beyond the honeycomb or all sides. Then further layers are added comprising the laminates 1, 2, 3 and 4 shown in FIG. 16, the orientation of continuous fibre of which is shown in FIG. 19. The laminates 1, 2, 3 and 4 extend over substantially the whole of the surface of one side of the tool, over the projecting part of the laminate that was initially placed on the tool face and over the remaining exposed surface of the honeycomb.

Then the laminates 15 to 18 are added to form inclined, spaced, parallel surfaces 48 and 49 towards the top and bottom such that the skin is thickened is the fore and aft regions. Finally, for the base layer, the laminate 19 is added to cover the exposed staggered edges of the laminates 5 to 18 as shown in FIG. 16. The orientation of the continuous filaments in the laminates 5 to 19 is shown in FIG. 19.

Then the stiffeners 42, 43, 44 and 45 are assembled in position. The stiffener 42 extends further away from the base layer 41 than the stiffener 43, which in turn extends further away from the base layer than the stiffeners 44. However, all of the stiffeners 42 to 44 extend across and beyond the honeycomb with their top flange away from the base of the mould tool being at a constant distance therefrom. Accordingly their flanges that extend normal to the base layer are inclined to reduce in depth as they extend across the angled edge 50 defined by the edge of the honeycomb, are of reduced depth across the honeycomb before being inclined to increase in depth as they leave the honeycomb.

Figures 15, 17:
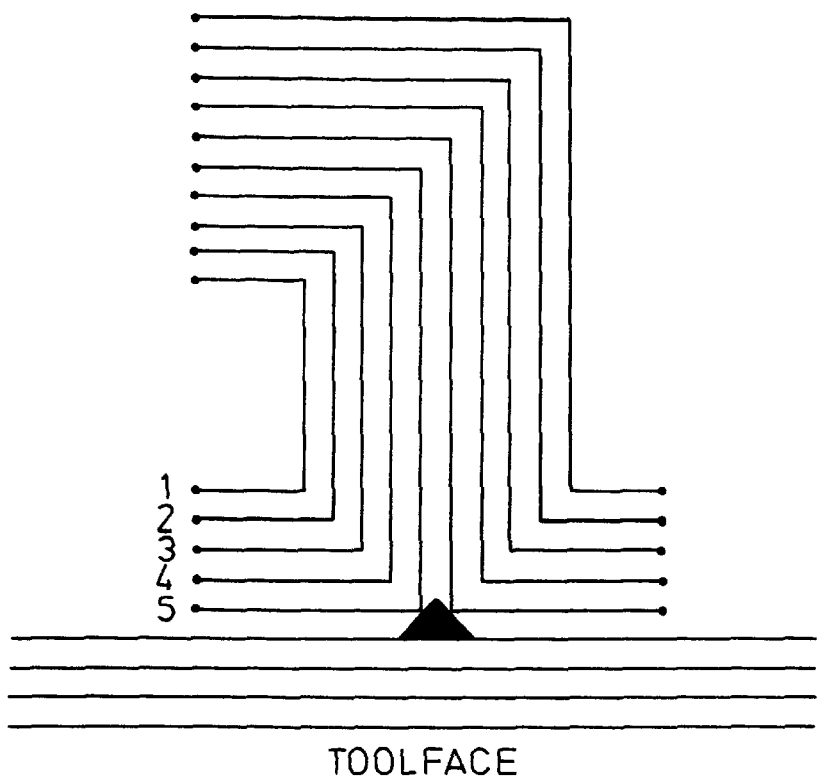

FIG. 14 shows the construction of the laminates 1 to 5 in the stiffeners 42 and 43 and the table in FIG. 18 shows the orientation of the continuous filaments in those laminates. FIG. 15 shows the construction of the stiffener 44 with the laminates 1 to 5 and the table in FIG. 17 shows the orientation of the continuous filaments in those laminates.

The construction in FIG. 12 is held in place with appropriate tools before being cured and with the structure then being carbonized.

Figure 20:
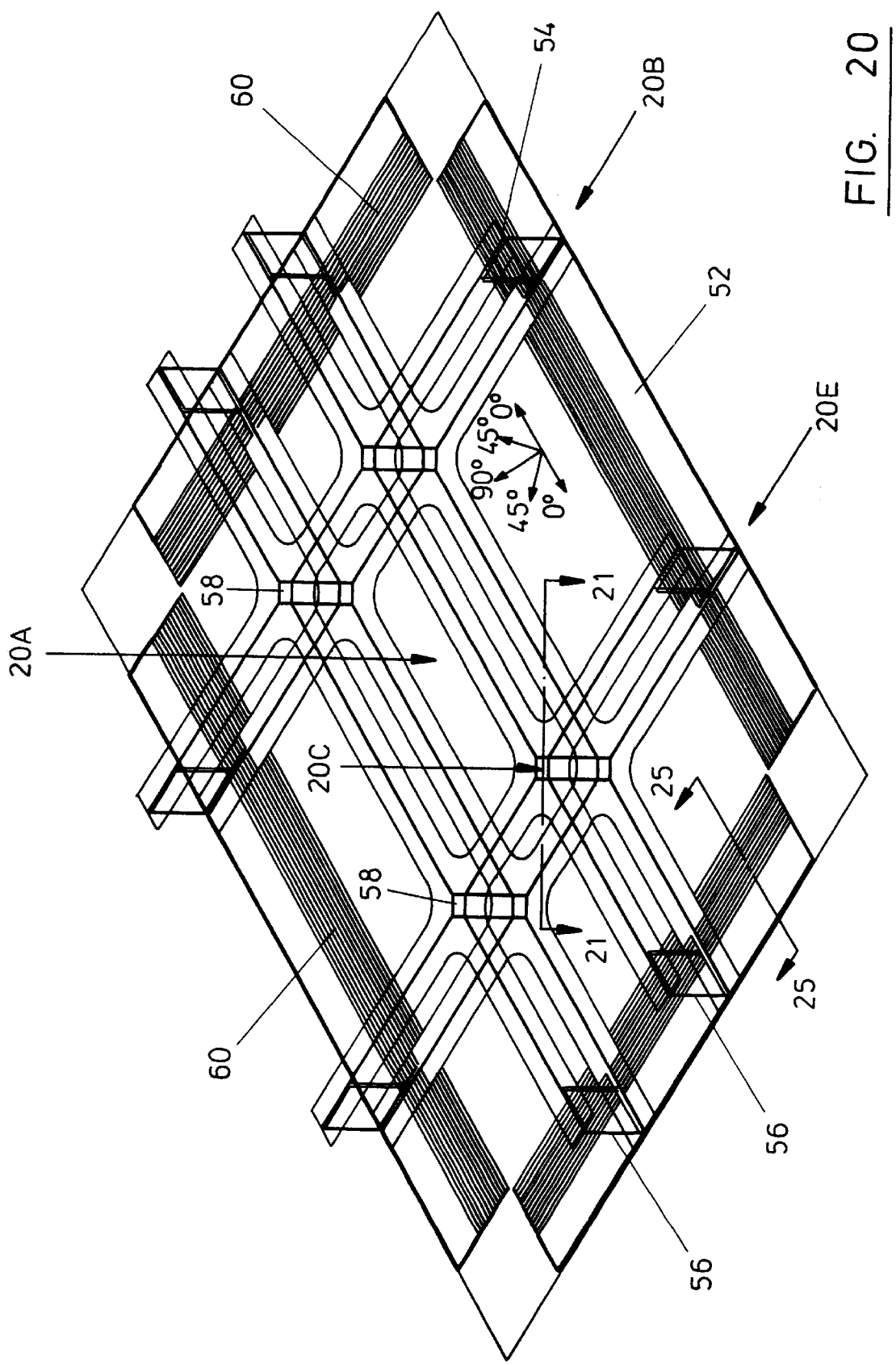
FIG. 20 is a perspective view of a reinforcement structure for use in a panel of a thrust reverser or another part of an aircraft or indeed in any application where strength is required.
Figure 20A:
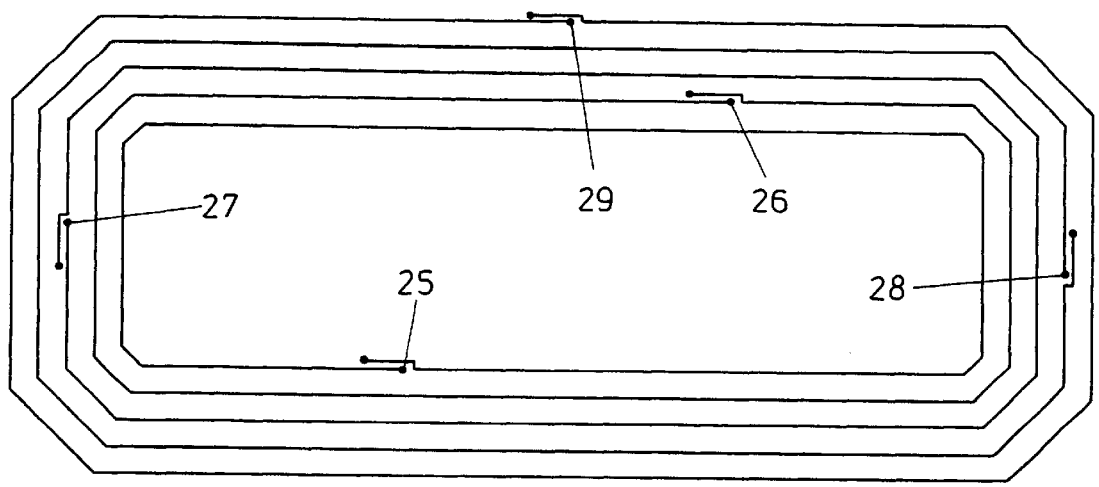
FIG. 20A is a view in the direction of arrow 20A in FIG. 20 showing the starting points for the ply lay ups for the central rectangle.
Figure 20B:
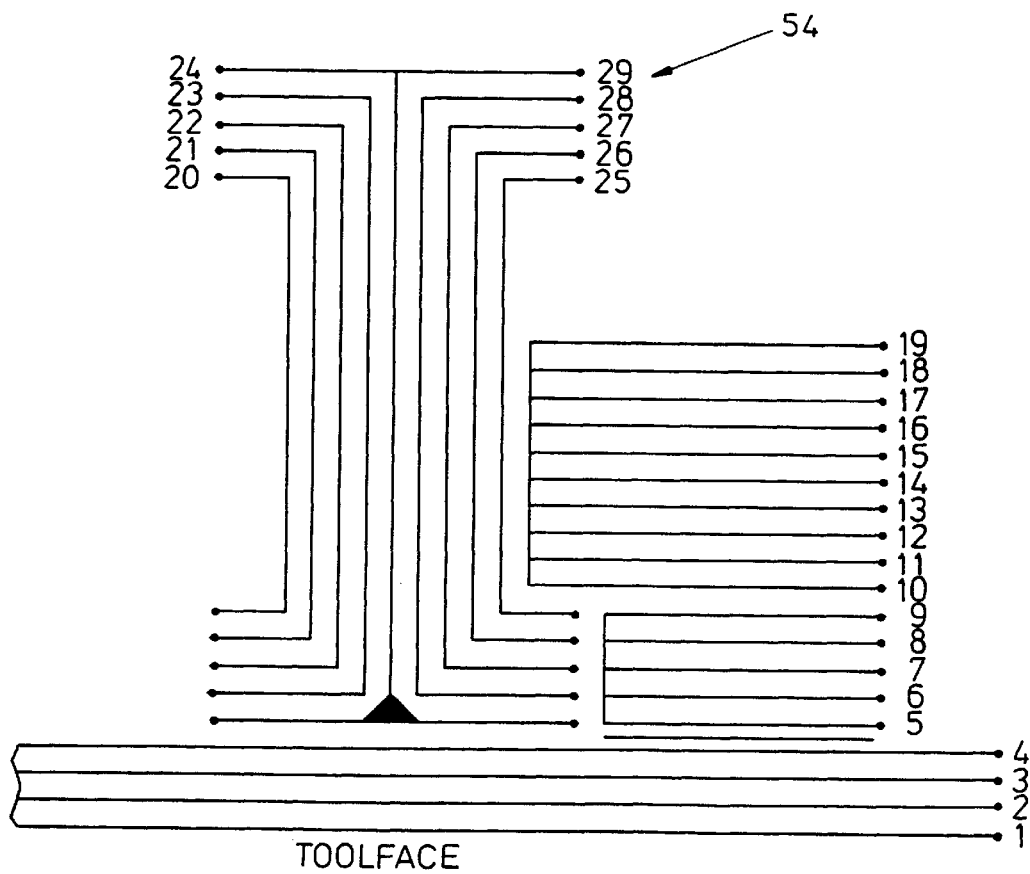
FIG. 20B is taken on the line 20B in FIG. 20 showing the relationship of layers 1 to 19 stiffeners 54.
Figures 20C, 20D:
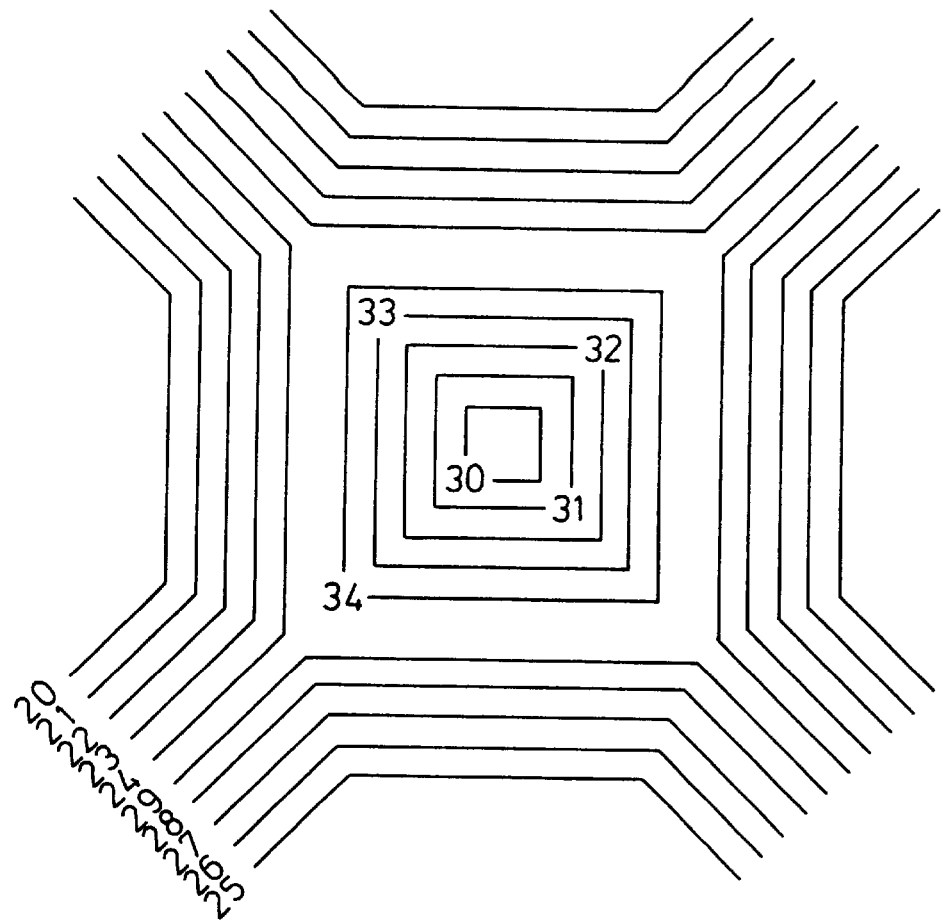
FIG. 20C is a cross-section through 20c—20c in FIG. 20 showing the orientation of layers in the joints between stiffeners and FIG. 20D is a table showing the orientation of the continuous filaments of these layers.
Figures 20E, 20F:
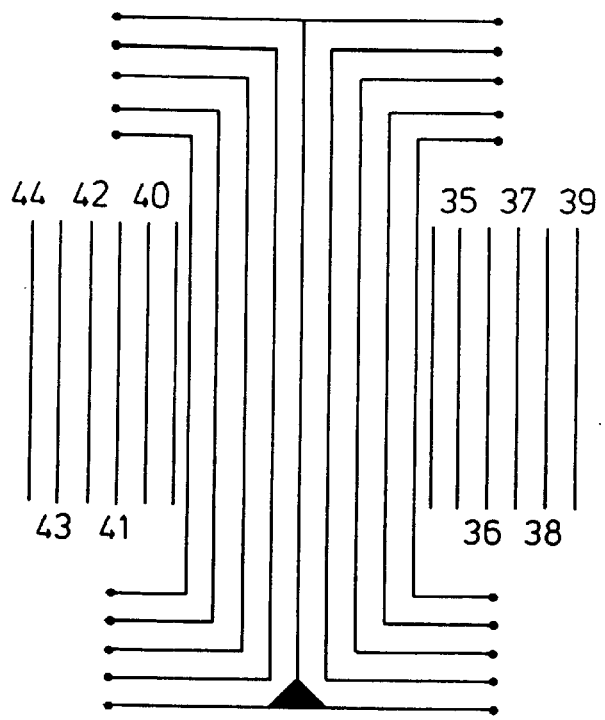
FIGS. 20E is an end view of a stiffener 54 of FIG. 20 showing the orientation of the layers and FIG. 20F is a table showing the relative orientation of the continuous filaments in those layers.

FIG. 20 shows a reinforcing structure that is of considerable strength having a backing sheet or base 52 and, on one side thereof, parallel spaced cross I stiffeners 54 and parallel spaced I stiffeners 56 at right angles to the stiffeners 54. The stiffeners 56 are closer together than the stiffeners 54. The stiffeners meet and cross at four junctions 58.

Figures 21, 22:
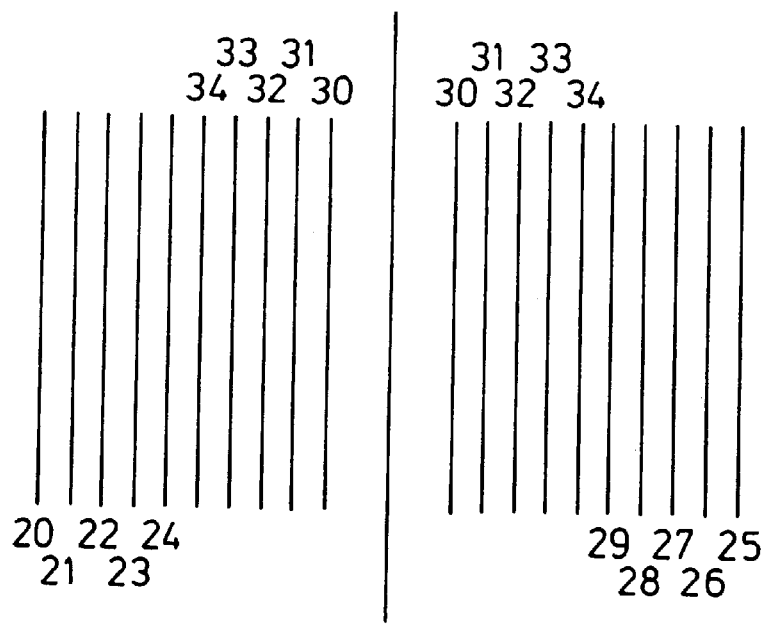
FIG. 21 is a sectional view showing the laminates that are present on the section 21—21 in FIG. 20.
FIG. 22 is a table showing the orientation of the continuous filaments in FIG. 21.

Each junction has a square hollow section of carbon fibre laminates 30 to 34 as can be seen from the section of FIG. 21. These laminates 30 to 34 extend around the hollow portion of the junction with the laminate 30 being innermost and the laminate 34 being outermost. The orientation of the continuous filaments in those laminates is shown in FIG. 22.

Figures 23, 24:
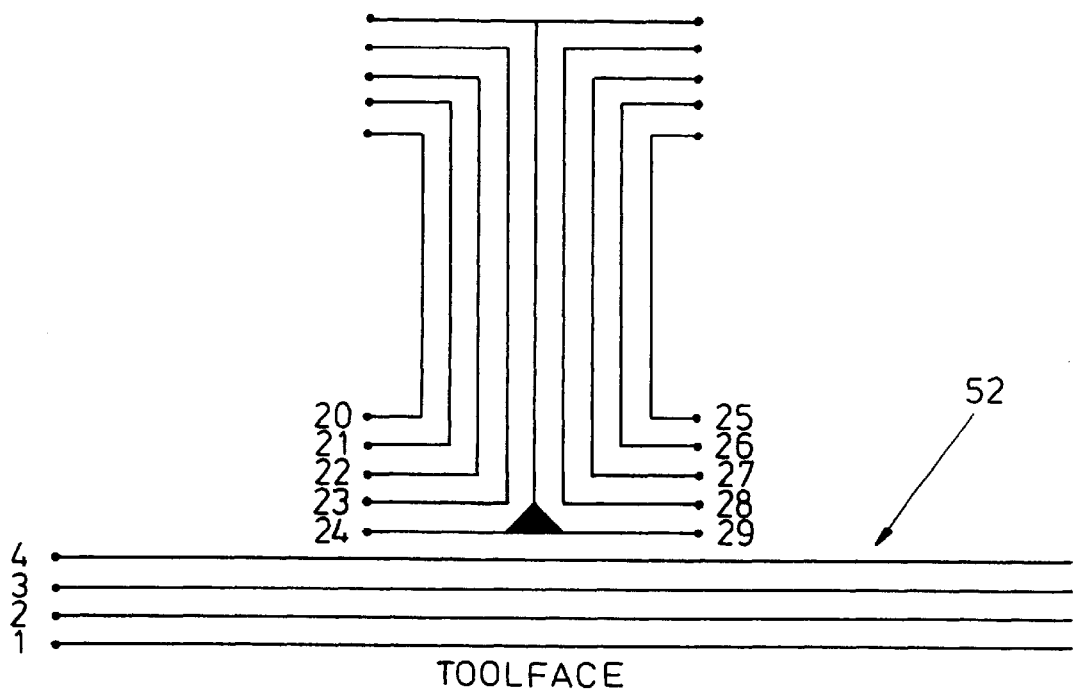
FIG. 23 is a sectional view on the lines 23—23 in FIG. 19 showing the laminates at that location.
FIG. 24 is a table showing the orientation of the continuous filaments in FIG. 23.

As shown in FIG. 23, each I stiffener includes five laminates at the top and bottom at each side of the central strut and ten laminates at the central strut where the side laminates extend between the top and bottom. These laminates are identified as 20 to 29 and the orientation of the continuous filaments as shown in the table of FIG. 24.

Where a stiffener 56 meets a cross stiffener 54, the included corner has some of the laminates in common.

Considering the central strut of an I stiffener, the laminates 20 to 24 to one side of a centre line running along the centre line extend along the stiffener 56, then along the laminate 34 of the square hollow section along one side thereof, and then along one side of the centre line of the other stiffener 54. The laminates 25 to 29 on the other sides of the struts 54 and 56 also extend around the square hollow section in a similar manner.

The laminates 20 to 24 and 25 to 29 of the stiffeners of the top and bottom thereof also divide at the junctions 58 and extend to be continuous from one stiffener 54 to the other 56.

Figures 25, 26:
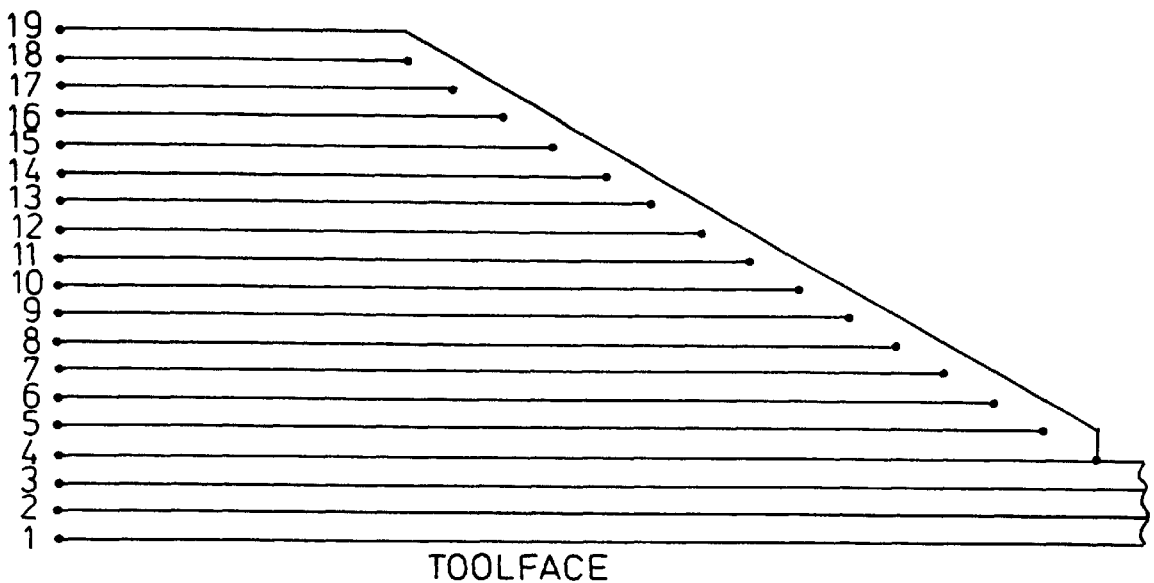
FIG. 25 is a sectional view showing the laminates that are present on the section 25—25 in FIG. 21.
FIG. 26 is a table showing the orientation of the continuous filaments in the laminates shown in FIG. 25.

FIG. 23 shows the four laminates 1 to 4 that are present in the backing sheet 52 and the table in FIG. 26 shows the orientation of the continuous filaments in those laminates.

FIG. 25 shows the orientation of the laminates at four right angled sides 60 in FIG. 20, outside of the junctions. At these sides 60, the four laminates 1 to 4 of the backing sheet 52 are reinforced with layers 5 to 19. The layers 5 to 18 decrease in extent inwardly of the sheet 52 from a common point with the sheet 19 covering the laminate 18 and extending downwardly and inwardly over the inner edges of the laminates 5 to 18 to connect with the laminate 4.

The orientation of the continuous filaments in the layers 5 to 19 is shown in FIG. 26.

The thickened sides 60 show in FIG. 20, the thickened surfaces 48 and 29 in FIG. 12 and the thickened portion surrounding the skin shown in FIG. 10, as defined by the laminates 5 to 11 in FIG. 9 can be used in testing the components. In this respect, the thickened portions can be gripped and forces such as tension forces can be applied selectively.

Figure 27:
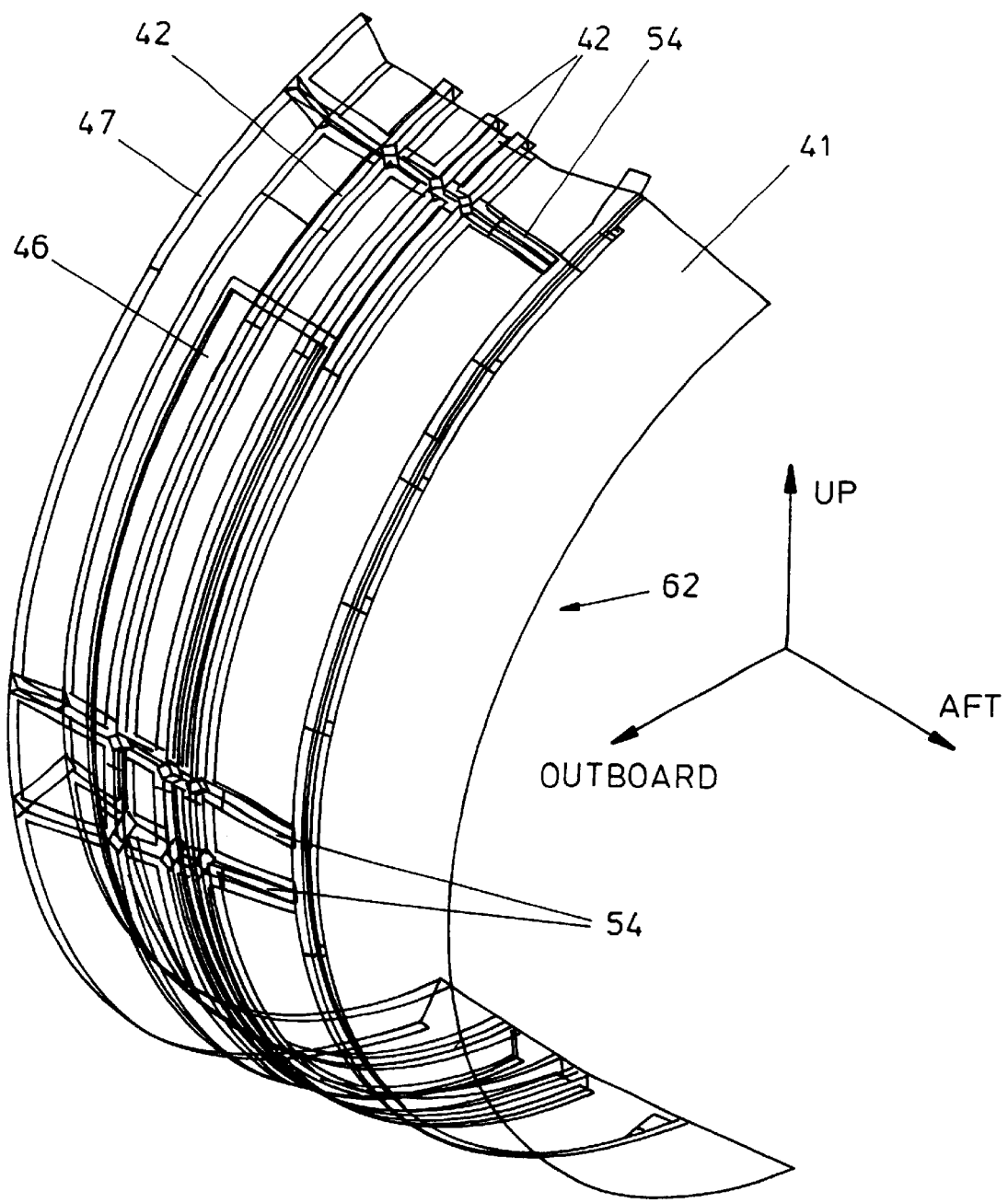
FIG. 27 is a view of an inner skin for outer fan duct structure taken from aft and from the outside.

FIG. 27 shows an inner skin 62 for a pivoting door thrust reverser. The inner skin is similar to that shown in FIG. 12 and is assembled in a one shot mould as detailed before. Like parts are given the same number.

The base layer 41 has the honeycomb on its outwardly facing surface as defined by the recess 46. I-shaped stiffeners 42 extend parallel to each other from the top to the bottom with two of those stiffeners extending across the honeycomb and one passing aft of the honeycomb.

Three cross I-stiffeners 54 are also present with the upper stiffener 54 being clear of the honeycomb and with the lower two stiffeners crossing the honeycomb.

Junctions 58 are present where stiffeners cross each other with the stiffeners being constructed largely as described in relation to FIG. 19.

The stiffener 42 most to the aft extends less far from the base layer 51 than the middle stiffener 42 and the stiffener 42 most to the fore extends furthest from the base layer.

Each cross stiffener 54 has a relatively short central flange at the aft region that increases in height in the fore direction such that the top flanges merge with the end 47 of the base layer.

Although the present invention has been described in relation to panels, it will be appreciated that the structures can be applied to moving structures such as pivoting doors, translating cowls, other forms of thrust reverser moving parts, fixed structure for all thrust reverses and other naceile structures such as intakes, fan cowl doors and nozzles. The actual structures drawn equate with fixed structure of a thrust reverser.

It can be seen that it is important for the outer skin to be flexible. If the skin were too rigid then an impact of relatively low energy would cause the skin to be pierced. It is also important that stiffeners be included to hold the skin in position during normal use. Those stiffeners though should not be so rigid as to prevent any flexure of the skins at their line of co-extent or immediately adjacent thereto as those regions would then be liable to damage under small energy impacts.

It is difficult to define any hard and fast rules for the flexibility of the skin. However, looking at FIGS. 10 and 10A and considering the thickness of the skin to be "S", the thickness of each layer of the skin and stiffener to be "L" and the distance between adjacent stiffeners to be "D", the following general parameters may apply:

S<2 mm and preferably in the region of 1 mm;
D>80 mm and preferably in the region of 120 mm or more
L is in the region of 0.25 mm;
The number of layers in the stiffener in a direction extending away from the plane of a skin is less than 12 and preferably in the region of 8 or less than 8 or in the region of 5.

The reader's attention is directed to all papers and documents which are filed concurrently with or previous to this specification in connection with this application and which are open to public inspectors with this specification, and the contents of all such papers and documents are incorporated herein by reference.

All of the features disclosed in this specification (including any accompanying claims, abstract and drawings), and/or all of the steps of any method or process disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A panel comprising a first skin structure incorporating a first skin and a second skin structure incorporating a second skin, a portion of the second skin being oppositely opposed and moveable towards the first skin, each of said first and second skin structures having a least one flanged strengthening portion connected thereto and extending towards an opposing one of said skin structures, said strengthening portion of said second skin being arranged to move partially past at least one flanged strengthening portion of the first skin structure as the second skin moves towards the first skin.

2. The panel as claimed in claim 1 wherein the first skin structure is more rigid than the second skin structure.

3. The panel as claimed in claim 1 wherein the second skin structure is arranged to more flexible than the first skin structure.

4. The panel as claimed in claim 1 wherein the first and second skin structures are connected together.

5. The panel as claimed in claim 1 wherein the first and second skin structures are detachably connected together.

6. The panel as claimed in claim 1 wherein the first and second skin structures are connected along peripheral regions.

7. The panel as claimed in claim 1 wherein the first and second skin structures are only connected along peripheral regions thereof.

8. The panel as claimed in claim 7 wherein a clearance is defined between the first and second skin structures and located in a region bounded by said peripheral regions.

9. The panel as claimed in claim 1 wherein the first and second skins define a cavity therebetween.

10. The panel as claimed in claim 1 wherein the first skin structure includes a noise abatement portion extending inwardly from an external surface thereof.

11. The panel as claimed in claim 10 wherein the first skin is perforated in the region of the noise abatement portion.

12. The panel as claimed in claim 1 wherein the portion of the second skin that is moveable towards the first skin flexes towards the first skin when the second skin is subject to an impact.

13. The panel as claimed in claim 12 wherein the portion of the second skin configured as movable towards the first skin is arranged to flex back to its previous configuration after the impact.

14. The panel as claimed in claim 1 wherein the first skin structure includes at least one strengthening portion and the second skin is arranged to abut the strengthening portion of the first skin when flexed towards the first skin.

15. The panel as claimed in claim 14 whereupon flexure of the skin structure towards the first skin structure urges the second skin structure to abut the strengthening portion of the first skin structure.

16. The panel as claimed in claim 14 wherein the first skin structure includes at least one flanged strengthening portion facing the second skin and extending over a noise abatement portion of the first skin structure.

17. The panel as claimed in claim 16 wherein the flanged strengthening portion extends over the noise abatement portion and to at least one side of the noise abatement portion.

18. The panel as claimed in claim 17 wherein the flanged strengthening portion that extends to at least one side of the noise abatement portion extends into the cavity from the first skin to substantially the same extent towards the second skin at both the location where the strengthening portion extends to one side of the noise abatement portion and at the location where the strengthening portion extends along the noise abatement portion.

19. The panel as claimed in claim 1 wherein the first skin structure includes an inner skin structure and the second skin structure has an outer skin structure.

20. The panel as claimed in claim 1 arranged as an aircraft panel in a thrust reverser or a fan duct structure.

21. A panel comprising a first skin structure incorporating a first skin and a second skin structure incorporating a second skin, a portion of the second skin being movable towards the first skin, the first skin structure including at least one strengthening portion to connected thereto, the second skin arranged to abut the strengthening portion of the first skin when flexed towards the first skin.

22. A panel comprising a first skin structure incorporating a first skin and a second skin structure incorporating a second skin, a portion of a the second skin being movable towards the first skin, the first skin structure including at least one flanged strengthening portion facing and spaced from the second skin and extending over a noise abatement portion that extends over only part of the first skin structure.

* * * * *